Figure 2:
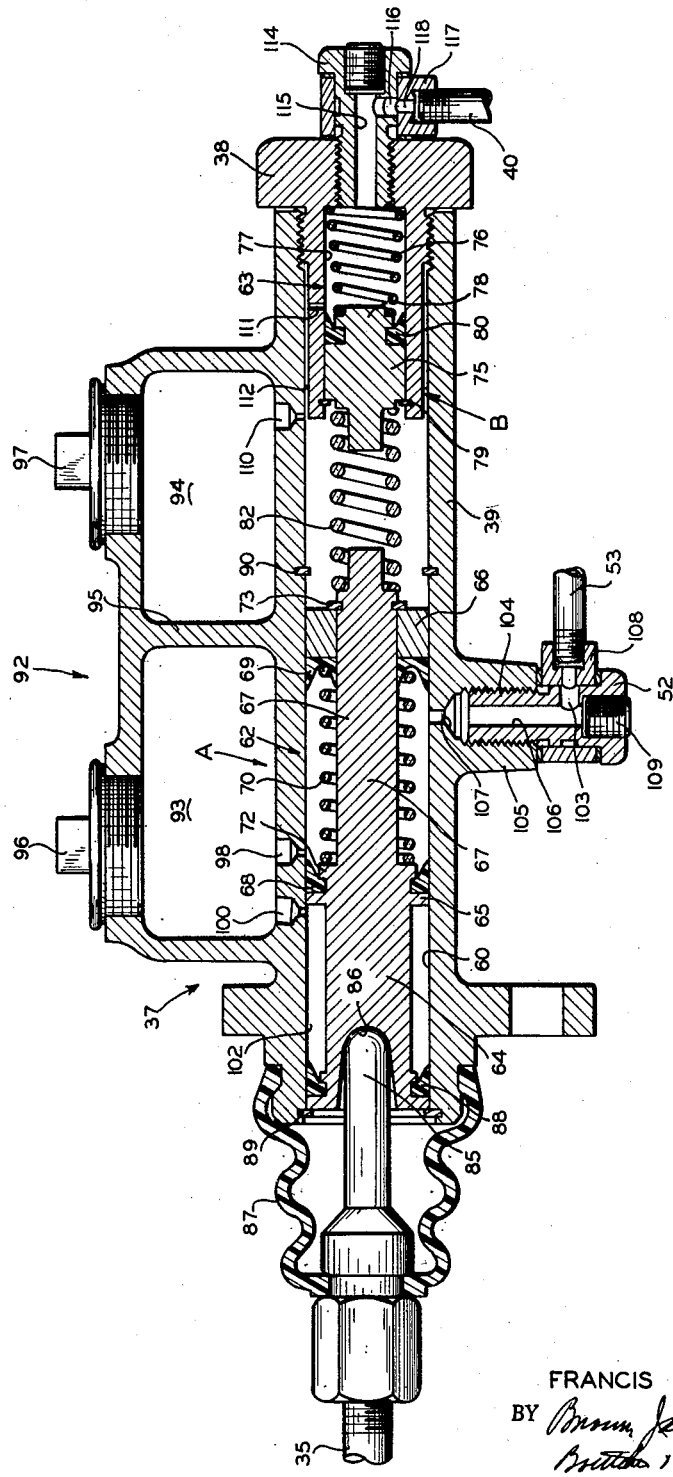

FIG. 1

Oct. 6, 1964  F. E. BRUKNER  3,151,459
MASTER CYLINDER
Filed April 10, 1963  2 Sheets-Sheet 2

INVENTOR
FRANCIS E. BRUKNER
BY
ATTORNEYS

United States Patent Office 3,151,459
Patented Oct. 6, 1964

3,151,459
MASTER CYLINDER
Francis E. Brukner, Battle Creek, Mich., assignor to Clark
Equipment Company, a corporation of Michigan
Filed Apr. 10, 1963, Ser. No. 272,038
9 Claims. (Cl. 60—54.6)

The present invention relates to a master cylinder for controlling actuation of a plurality of fluid actuatable devices and has utility, by way of example, in industrial trucks to effect so-called "inching" and application of the brakes of such vehicles.

An inching control and braking system of the character in which the master cylinder of the present invention may be employed is disclosed in United States Letters Patent No. 2,917,143, dated December 15, 1959, to Asa Jenney. This patent is owned by the assignee of the instant application and its disclosure with respect to an inching control is incorporated in the present application by reason of the foregoing reference.

The present invention is concerned with an improved master cylinder which may be substituted for certain of the components of the construction of the foregoing patent so as to provide a more convenient and simplified arrangement of parts for effecting inching and braking of a vehicle. The construction of the above mentioned patent embodies a master cylinder having a single outlet connected with separate fluid actuated inching and brake applying devices which must be adjusted with respect to each other to afford the desired control of a vehicle. These separate components are independently fabricated and assembled which adds to the cost of the equipment.

It is an object of the present invention to provide a master cylinder having a plurality of fluid outlets and embodying means for integrating predetermined discharge of fluid under pressure from said outlets for purposes of effecting desired actuation of a plurality of fluid actuatable devices.

A further and more specific object of the invention is to provide a master cylinder having means for effecting predetermined selective actuation of control means suitable for effecting inching and braking of a vehicle.

In order to achieve the foregoing objects, it is proposed according to this invention to provide a master cylinder having a housing in which a pair of piston and cylinder assemblies are incorporated. The cylinders of the piston and cylinder assemblies have connection with fluid reservoir means of the housing and each cylinder is provided with a fluid outlet. First and second piston means are arranged, one in each of the cylinders, with displacement of the pistons effecting sequential discharge of fluid from the outlets of the cylinders. The first of the foregoing piston means comprises first and second piston components. An actuator is provided to engage the first piston means with movement of such piston means in one direction in its cylinder being adapted through a spring between it and the second piston means effecting displacement of the latter in the second cylinder to discharge fluid therefrom through its associated outlet. Upon predetermined movement of the actuator and first piston means in the stated one direction, one of the piston components of the first piston means is arrested and continued movement of the other of the piston components moves towards the now stationary piston component so as to discharge fluid through the outlet associated with the first cylinder. The arrangement is such that fluid is discharged sequentially from the pair of cylinders which admirably adapts the master cylinder for controlling inching and braking systems of an industrial truck.

A preferred feature of the invention resides in the provision of spring means between the first and second piston means through which movement of the first piston means by the actuator means is imparted to the second piston means.

A further preferred feature resides in providing the housing with a bore which, in part, defines the first cylinder and a plug member at one end of the bore for defining a second cylinder, and in which the outlet for the second cylinder is defined by port means in the plug member.

A still further preferred feature resides in providing a housing with a two compartment fluid supply reservoir to afford independent sources of supply of fluid for the pair of cylinders.

The above and further objects and features of this invention will be apparent from the following detailed description of a preferred embodiment of the invention.

Now in order to acquaint those skilled in the art with the manner of constructing and utilizing devices embodying the invention of this application, there is described below a preferred embodiment of the invention.

In the drawings:

FIGURE 1 is a schematic representation of a typical hydraulic system for inching and braking a vehicle in which the master cylinder of the present invention has been incorporated; and FIGURE 2 is a vertical sectional view with certain parts being shown in elevation of a master cylinder constructed in accordance with the principles of this invention.

Referring now to FIGURE 1, the inching control means 10 is the same as that shown and described in the aforementioned Patent No. 2,917,143 and as there described is employed in a hydraulic transmission circuit of an industrial lift truck. The inching valve means 10 serves to control the pressure of fluid supplied by inlet 11 from the hydraulic pump of the vehicle's transmission to conduit means 12 leading to a clutch direction selection means 13. The clutch selection means 13 controls the actuation of reverse and forward direction selectors 14 and 15, respectively, of the vehicle's clutch system. The inching valve means 10 includes a valve piston or spool 16 which is actuated to the left, as viewed in the drawing, by fluid pressure at the right hand end thereof. Such movement of spool 16 serves to compress a spring system comprising a pair of compression springs 17 and 18 which extend between the left hand end of spool 16 and a secondary piston 19, the latter being operated hydraulically in response to actuation of a brake pedal of a vehicle, as indicated generally at 20, as will be described more fully hereinafter.

The details of the inching control valve 10 are dealt with at length in Bolster et al. Patent No. 2,814,371 dated November 26, 1957, to which reference may be had. For purposes of this disclosure, it is sufficient to point out that the operation of the piston spool 16 in response to movement of the brake pedal 20 serves first to diminish the pressure of fluid supplied in the main supply conduit 11 to conduit 12 and direction selector means 13 by opening a by-pass sump passageway 22 and thereafter to regulate the pressure of fluid supplied to the clutches 14 and 15 through conduit means 12. Essentially, this system is constructed so that initially pressure of the brake pedal 20 serves to vent off the pressure of the supply fluid until a workable limit is reached which function is followed by a gradual deactivation or declutching of the fluid operated clutches associated with the vehicle.

As shown in FIGURE 1, the brake pedal 20 is mounted for pivotal movement upon a shaft 30. An arm 32 is also connected to the shaft 20 and it, at its upper end is pivotally connected to an adjustable extension of an actuator rod means 35 for effecting actuation of master cylinder 37. The master cylinder 37 forming the subject matter of this invention is shown in detail in FIGURE 2.

A plug member 38, as will be described in greater detail below, is threaded in the housing 39 of the master cylinder and provides a fluid outlet for the inching control valve 10. A conduit 40 extends from the plug 38 to the housing of a cylinder 42 of a piston and cylinder assembly 43. A piston 44 is movably mounted in cylinder 42 and a piston rod 45 has one end connected to piston 44 and its other end pivotally connected to a crank arm 46 mounted on a shaft 47. A spring 48 of the piston and cylinder assembly 43 normally urges the piston 44 and piston rod 45 to the left as viewed in FIGURE 1. A second crank arm 49 is also mounted on shaft 47 and a rod 50 pivotally connected at one end to the outer end of crank arm 49 has connection at its other end with the before described secondary piston 19 of inching valve control means 10. The spring 48 normaly urges rotation of crank arms 46 and 49 in clockwise direction which through springs 17 and 18 disposes the inching valve 16 to its right hand non-regulating position.

A second plug or fitting 52 is mounted in the master cylinder housing 39 and it provides a second fluid outlet for the master cylinder. A conduit 53 extends to a pair of wheel cylinders 54 associated in a well known manner with a pair of vehicle wheels 55 having any suitable known form of fluid actuatable means for braking the vehicle wheels 55.

Referring now to FIGURE 2 of the drawings, it will be seen that housing 39 of master cylinder 37 is formed with a bore 60 which in part defines a first cylinder 62 of a first piston and cylinder assembly A, and in which plug member 38 threaded in the housing at one end of the bore defines a second cylinder 63 of a second piston and cylinder assembly B. A first piston means indicated at 64 is movably mounted in the first cylinder 62 and comprises a first piston component 65 and a second piston component 66 with the latter being mounted for sliding movement on a reduced shaft portion 67 and which, as will presently appear, provides for relative movement of the first and second piston components 65 and 66 axially of the axis of cylinder 62 with respect to each other. A pair of conventional piston seal rings 68 and 69 are associated with piston components 65 and 66, respectively. A coil spring 70 seats on one end on an annular shoulder 72 of member 64 and the other end of the spring seats on sealing ring 69 engaging the latter with the second piston component 66 and in the position of the parts shown in FIGURE 2 seating the second piston component 66 against a snap lock ring 73 mounted at the inner end of shaft portion 67. The spring 70 thus normally tends to maintain the first and second spring components at their maximum axial spaced relation with respect to each other in the first cylinder 62.

A second piston means 75 is movably mounted in the second cylinder 63 and a coil spring 76 at one end abuts plug member 38 at the base of bore 77 defining the inner surface of cylinder 63, and its other end engages an annular flange 78 of piston 75 biasing the latter into engagement with a snap lock ring 79 at the open end of the bore 77. A conventional oil seal ring 80 is carried by the piston 75.

A coil spring 82 is arranged between the first and second piston means 64 and 75 and it is of greater strength than the coil spring 76 so that upon movement of the first piston means 64 to the right force is transmitted through coil spring 82 to displace the second piston means 75 to the right in the second cylinder 63 against the force of spring 76 to displace fluid from the second cylinder 63 as will be presently described.

The actuating means 35 previously mentioned is formed with an extension 85 having a rounded end fitting into a socket 86 formed in the outer end of the first piston means 64. A conventional boot 87 is mounted between actuating means 35 and the adjacent end of housing 39 to protect the interior of the master cylinder.

The first piston means 64 is provided with a further oil seal ring 88 at its outer end. The piston means 64 is retained within the bore 60 by spaced apart snap lock rings 89 and 90, respectively. The snap ring 90 serves importantly as an abutment or arresting means for the second piston component 66 upon movement of the first piston means 64 to the right from the position as shown in the drawing. Upon such right hand movement the second piston component 66 engages or moves to the right until it engages stop member 90 after which its movement is arrested so that upon continued movement to the right of piston 64, the first piston component 65 moves toward the second piston component 66 compressing spring 70 therebetween and reducing the volume of the cylinder 62 to displace fluid therein for vehicle braking purposes as will be described below.

The housing 39 of the master cylinder 37 is provided with a fluid reservoir, indicated generally at 92, and in the form shown comprises a pair of compartments 93 and 94 separated by a wall 95 extending vertically therebetween. Filler caps 96 and 97 provide for access to the compartments 93 and 94 for replenishing or charging the compartments with suitable fluid for actuating the inching control and brake system of a vehicle. A first port 98 extends from the compartment 93 and opens into the first cylinder 62. It will also be noted that a second port 100 opens into an annular recess 102 formed between the oil seal ring 88 and the first piston component 65. The latter port provides for pressure relief of any fluid entrapped in the annular recess 102. In the position of the parts as shown in FIGURE 2 the cylinder 62 has connection with the fluid in compartment 93 through the port 98 and as previously mentioned, the fitting 52 provides a first fluid outlet from the cylinder 62. The fitting 52 is suitably threaded as at 104 in a boss portion 105 of the master cylinder housing and is formed with a bore as at 106 connecting with an outlet port 107 from cylinder 62 so that fluid may be discharged through a lateral bore 103 and through a knuckle 108. A plug 109 has threaded engagement at the end of the fitting 52 for closing off the bore 106. The previously described conduit 53 as shown has threaded engagement with the knuckle 108.

The second compartment 94 of the reservoir 92 is formed with a discharge port 110 opening into the bore 60 between first piston means 64 and the plug member 38, with the latter being provided with an inlet port 111 so that fluid from compartment 94 passes through the annular recess defined by the inner surface of the bore 60 and the outer peripheral surface of the inwardly extending portion of the plug member 38 into the cylinder 63. An outlet for cylinder 63 is provided by a fitting 114 having threaded engagement with the plug 38 which is provided with a bore 115 for communicating with the cylinder 63. A knuckle 117 is provided with a bore 118 communicating through a lateral bore 116 connecting with bore 115 of the member 114. The conduit 40 extends from the knuckle 117 and has connection with the inching valve as aforedescribed in connection with FIGURE 1.

In the off or released position of brake 20 the components of the master valve occupy the positions shown in FIGURE 2. Upon initial depression of the brake pedal 20, actuator rod means 35 is caused to be moved to the right, as viewed in the drawing, and such movement shifts the first piston means 64 to the right and through the spring 82 effects movement of the second piston means 75 to the right. Such movement of piston means 75 disposes oil seal ring 80 to a position closing inlet port 111 and effects the discharge of fluid under pressure from cylinder 63 outwardly through the bores 115, 116 and 118 and conduit 40 to the piston and cylinder assembly 43 of FIGURE 1. Fluid under pressure admitted to cylinder 42 moves the piston 44 and piston rod 45 to the right to effect counter-clockwise rotation of the crank arms 46 and 49 causing inching valve element 16 to move to the left which effects gradual reduction in hydraulic pressure in the transmission clutches 14 and 15, thereby permitting the clutches to increasingly slip and reduce the drive to the wheels in a controlled manner to provide desired inching of the vehicle.

In order to effect braking of the vehicle, the brake pedal 20 is depressed as before, but to an extent beyond the initial movement utilized in effecting inching of the vehicle. Upon depression of brake pedal 20 to effect a braking operation, the first piston means 64 upon movement to its braking position disposes the second piston means 75 to a position in which the clutches 14 and 15 are caused to be fully disengaged. In the movement of the brake pedal 20 toward its braking position, the inlet port 93 is first closed off by oil seal ring 68. Thereafter the piston component 66 is arrested by the stop ring 90 and continued movement of the first piston means to the right provides for movement of the first piston component 65 axially toward the second piston component 66 by reason of the sliding movement of the shaft portion 67 in the second piston component 66 thereby reducing the effective volume of the first cylinder 62 so that fluid under pressure is discharged through the port 107, bores 106 and 103, knuckle 108 to conduit 53, and thence to the components of the braking system as previously described to thus effect application of the brakes of the vehicle.

It will be noted from FIGURE 2 that when piston 64 is initially moved to the right, piston 75 moves into cylinder 63 forcing oil through port 115 into the inching piston, since spring 82 is heavier than spring 76. The master cylinder is designed so that the inching requirement is satisfied slightly before or at the same time the brake linings contact the brake drums. When the inching requirement is satisfied further movement of piston 64 to the right causes pressure to increase in cylinder 63, so when the pressure in cylinder 63 plus the weight of spring 76 becomes greater than the weight of spring 82, spring 82 compresses permitting additional movement of piston 64 forcing additional fluid, if required, from cylinder 62 through port 106 to the brake cylinders until braking requirements are satisfied.

In the arrangement above described in which the reservoir 92 comprises two compartments 93 and 94, it will be seen that separate fluid sources may be provided for inching and for braking the vehicle. However, if but a single fluid source is desired, the reservoir may be fabricated without the partition wall 95 in which event both the inching and braking systems will have a common source of fluid supply.

While a preferred form of the invention has been shown and described, it will be understood that various modifications and rearrangements may be made therein without departing from the spirit and scope of the invention.

The invention claimed is:

1. A master cylinder comprising a housing, first and second piston and cylinder assemblies in said housing, fluid reservoir means, said first and second piston and cylinder assemblies having fluid inlets connected with said fluid reservoir means and outlets, said first piston and cylinder assembly comprising first piston means defined by relatively movable first and second piston components, actuator means for moving said piston means of said first piston and cylinder assembly, means between said first piston means and the piston of said second piston and cylinder assemblies for effecting movement of said piston of said second piston and cylinder assembly for discharging fluid through the outlet thereof upon initial predetermined movement of said piston of said first piston and cylinder assembly by said actuator means, and means associated with said first piston and cylinder assembly upon further movement of said first piston means thereof by said actuator means effecting relative movement of said first and second piston components of said first piston means to discharge fluid from the cylinder of said first piston and cylinder assembly through the outlet thereof.

2. A master cylinder comprising a housing, first piston means movably mounted in a first cylinder in said housing, said first piston means comprising spaced apart relatively movable first and second piston components, a first fluid outlet for said first cylinder, second piston means movably mounted in a second cylinder in said housing, a second fluid outlet for said second cylinder, spring means between said first and second piston means normally biasing them away from each other, fluid reservoir means supplying fluid to said first and second cylinders, actuator means engageable with said first piston means moving the same in one direction in said first cylinder and through said spring means move said second piston in said second cylinder to discharge fluid therefrom through said second fluid outlet, means in said housing arresting movement of said second piston component upon predetermined movement of said first piston means in said one direction in said first cylinder, and said actuator means upon continued movement in said one direction effecting movement of said first piston component toward said second piston component to discharge fluid therebetween through said first outlet.

3. A master cylinder comprising a housing, first piston means movably mounted in a first cylinder in said housing, said first piston means comprising spaced apart relatively movable first and second piston components, a first fluid outlet for said first cylinder, second piston means movably mounted in a second cylinder in said housing, a second fluid outlet for said second cylinder, spring means in said second cylinder for normally biasing said second piston means away from said second outlet, second spring means stronger than said first spring means between said first and second piston means normally biasing them away from each other, fluid reservoir means in said housing supplying fluid to said first and second cylinders, actuator means engageable with said first piston means moving the same in one direction in said first cylinder and through said second spring means move said second piston in said second cylinder against said first spring means to discharge fluid from said second cylinder through said second fluid outlet, means in said housing arresting movement of said second piston component upon predetermined movement of said first piston means in said one direction in said first cylinder, and said actuator means upon continued movement in said one direction effecting movement of said first piston component toward said second piston component to discharge fluid therebetween through said first outlet.

4. A master cylinder comprising a housing, first piston means movably mounted in a first cylinder in said housing, said first piston means comprising spaced apart first and second piston components movable relative to each other axially of said first cylinder, first spring means between said first and second piston components for normally biasing them away from each other, a first fluid outlet for said first cylinder, second piston means movably mounted in a second cylinder in said housing, a second fluid outlet for said second cylinder, second spring means between said first and second piston means normally biasing them away from each other, fluid reservoir means supplying fluid to said first and second cylinders, actuator means engageable with said first piston means moving the same in one direction in said first cylinder and through said second spring means move said second piston in said second cylinder to discharge fluid therefrom through said second fluid outlet, means in said housing arresting movement of said second piston component of said first piston means upon predetermined movement of said first piston means in said one direction in said first cylinder, and said actuator means upon continued movement in said one direction effecting movement of said first piston component against said first spring means axially toward said second piston component to discharge fluid therebetween through said first outlet.

5. A master cylinder comprising, a housing, first piston means movably mounted in a first cylinder in said housing, said first piston means comprising spaced apart first and second piston components movable relative to each other axially of said first cylinder, first spring means between said first and second piston components normally biasing them away from each other, a first fluid outlet for said first cylinder, second piston means movably mounted in a second cylinder in said housing, a second fluid outlet for said second cylinder, second spring means in said second cylinder normally biasing said second piston means away from said second outlet, third spring means stronger than said second spring means between said first and second piston means normally biasing them away from each other, fluid reservoir means in said housing supplying fluid to said first and second cylinders, actuator means engageable with said first piston means moving the same in one direction in said first cylinder and through said third spring means move said second piston in said second cylinder against said second spring means to discharge fluid from said second cylinder through said second fluid outlet, means in said housing arresting movement of said second piston component of said first piston means upon predetermined movement of said first piston means in said one direction in said first cylinder, and said actuator means upon continued movement in said one direction effecting movement of said first piston component against said first spring means axially toward said second piston means to discharge fluid therebetween through said first outlet.

6. A master cylinder comprising a housing first piston means movably mounted in a first cylinder in said housing, said first piston means comprising spaced apart first and second piston components movable relative to each other axially of said first cylinder, first spring means between said first and second piston components normally biasing them away from each other, a first fluid outlet for said first cylinder, second piston means movably mounted in a second cylinder in said housing, a second fluid outlet for said second cylinder, second spring means in said second cylinder normally biasing said second piston mean away from said second outlet, third spring means stronger than said second spring means between said first and second piston means normally biasing them away from each other, fluid reservoir means in said housing comprising two compartments one supplying fluid to said first cylinder and the other supplying fluid to said second cylinder, actuator means engageable with said first piston means moving the same in one direction in said first cylinder and through said third spring means move said second piston in said second cylinder against said second spirng means to discharge fluid from said second cylinder through said second fluid outlet, means in said housing arresting movement of said second piston component of said first piston means upon predetermined movement of said first piston means in said one direction in said first cylinder, and said actuator means upon continued movement in said one direction effecting movement of said first piston component against said first spring means axially toward said second piston means to discharge fluid therebetween through said first outlet.

7. A master cylinder comprising a housing, said housing having a bore in part defining a first cylinder, first piston means movably mounted in said first cylinder, said first piston means comprising spaced apart first and second piston components movable relative to each other axially of said first cylinder, first spring means between said first and second piston components normally biasing them away from each other, a first fluid outlet for said first cylinder, a plug member mounted at one end of said bore and defining a second cylinder, second piston means movably mounted in said second cylinder, a second fluid outlet in said plug for said second cylinder, second spring means in said second cylinder normally biasing said second piston means away from said second outlet, third spring means stronger than said second spring means between said first and second piston means normally biasing them away from each other, fluid reservoir means in said housing supplying fluid to said first and second cylinders, actuator means engageable with said first piston means moving the same in one direction in said first cylinder and through said third spring means move said second piston in said second cylinder against said second spring means to discharge fluid from said second cylinder through said second fluid outlet, means in said housing arresting movement of said second piston component of said first piston means upon predetermined movement of the same toward said second piston means, and said actuator means upon continued movement in said one direction effecting movement of said first piston component against said first spring means axially towards the second piston means to discharge fluid therebetween through said first outlet.

8. A master cylinder comprising a housing, said housing having a bore in part defining a first cylinder, first piston means movably mounted in said first cylinder, said first piston means comprising spaced apart first and second piston components movable relative to each other axially of said first cylinder, first spring means between said first and second piston components normally biasing them away from each other, a first fluid outlet in said housing for said first cylinder, a plug member mounted in said bore of said housing and defining a second cylinder, second piston means movably mounted in said second cylinder, a second fluid outlet in said plug for said second cylinder, second spring means in said second cylinder normally biasing said second piston means away from said second outlet, third spring means stronger than said second spring means between said first and second piston means normally biasing them away from each other, fluid reservoir means in said housing comprising two compartments, one supplying fluid to said first and the other supplying fluid to said second cylinder, actuator means movable axially of said bore and engageable with said first piston means moving the same in one direction in said first cylinder and through said third spring means move said second piston in said second cylinder against said second spring means to discharge fluid from said second cylinder through said second fluid outlet, means in said housing arresting movement of said second piston component of said first piston means upon predetermined movement of said first piston means in said one direction in said first cylinder, and said actuator means upon continued movement in said one direction effecting movement of said first piston component against said first spring means axially toward said second piston means to discharge fluid therebetween through said first outlet.

9. A master cylinder comprising a housing, said housing having a bore defining a first cylinder, first piston means movably mounted in said first cylinder, said first piston means comprising spaced apart first and second piston components movable relative to each other axially of said first cylinder, first spring means between said first and second piston components normally biasing them away from each other, a first fluid outlet in said housing for said first cylinder, a plug member mounted in said bore of said housing and defining a second cylinder, second piston means movably mounted in said second cylinder, a second fluid outlet in said plug for said second cylinder, second spring means in said second cylinder normally biasing said second piston means away from said second outlet, third spring means stronger than said second spring means between said first and second piston means normally biasing them away from each other, fluid reservoir means in said housing, first port means in said housing connecting said reservoir means with said first cylinder, second port means in said housing and third port means in said plug means for connecting said reservoir means with said second cylinder, actuator means movable axially of said bore and engageable with said first piston means moving the same in one direction in said first cylinder and through said third spring means move said second piston in said second cylinder against said second spring means to close said third port means and discharge fluid from said second cylinder through said second fluid outlet, means in said bore arresting movement of said second piston component of said first piston means upon predetermined movement of said first piston means in said one direction in said first cylinder, and said actuator means upon continued movement in said one direction effecting movement of said first piston component against said first spring means axially toward said second piston means to close said first port means and discharge fluid between said first and second piston components through said first outlet.

References Cited in the file of this patent

UNITED STATES PATENTS

| | | |
|---|---|---|
| 2,157,733 | Sessions | May 9, 1939 |
| 3,064,432 | Shutt | Nov. 20, 1962 |